US012521733B2

(12) United States Patent
Zhong

(10) Patent No.: US 12,521,733 B2
(45) Date of Patent: Jan. 13, 2026

(54) CENTRIFUGAL IDENTIFICATION DISK AND CENTRIFUGE

(71) Applicant: Yaoyang Zhong, Roslyn Heights, NY (US)

(72) Inventor: Yaoyang Zhong, Roslyn Heights, NY (US)

( * ) Notice: Subject to any disclaimer, the term of this patent is extended or adjusted under 35 U.S.C. 154(b) by 0 days.

(21) Appl. No.: 19/046,088

(22) Filed: Feb. 5, 2025

(65) Prior Publication Data

US 2025/0177999 A1 Jun. 5, 2025

Related U.S. Application Data

(63) Continuation of application No. PCT/CN2023/125762, filed on Oct. 20, 2023.

(51) Int. Cl.

*B04B 9/14* (2006.01)
*B04B 5/04* (2006.01)
*B04B 15/00* (2006.01)

(52) U.S. Cl.

CPC .............. *B04B 9/14* (2013.01); *B04B 5/0414* (2013.01); *B04B 15/00* (2013.01)

(58) Field of Classification Search

CPC ......... B04B 9/14; B04B 5/0414; B04B 15/00; B04B 5/04; B04B 5/0407; B04B 5/0421; B04B 2005/0435; B04B 2009/143; B04B 2009/146; B04B 13/003

USPC .................................. 494/10, 12, 16, 20, 85

See application file for complete search history.

(56) References Cited

U.S. PATENT DOCUMENTS

| | | | | |
|---|---|---|---|---|
| 4,102,490 A * | 7/1978 | Chulay | B04B 13/003 | 494/10 |
| 2004/0166551 A1* | 8/2004 | Moulds | B01L 3/5021 | 435/13 |
| 2021/0370321 A1* | 12/2021 | Piramoon | B04B 5/0414 | |

FOREIGN PATENT DOCUMENTS

| | | |
|---|---|---|
| CN | 204365485 U | 6/2015 |
| CN | 210131719 U | 3/2020 |
| CN | 217249775 U * | 8/2022 |
| CN | 217699612 U * | 11/2022 |
| JP | H08103689 A * | 4/1996 |

* cited by examiner

*Primary Examiner* — Claire X Wang
*Assistant Examiner* — Shuyi S. Liu
(74) *Attorney, Agent, or Firm* — Maier & Maier, PLLC

(57) ABSTRACT

A centrifugal identification disk, which includes an indicating ring, a clearance portion is provided in the indicating ring, and the clearance portion fits around an outer side of a centrifugal assembly of a centrifuge body, a plurality of indicating portions, the plurality of indicating portions are arranged on a surface of the indicating ring; each indicating portion includes an indicating icon, the indicating icons are circumferentially arranged on the indicating ring to indicate balanced positions for experimental test tubes on the centrifugal assembly. The problem of how to add device indicating placement of test tubes to existing centrifuge is solved, thereby increasing the property and reliability of the centrifuge.

8 Claims, 2 Drawing Sheets

2-2

CENTRIFUGAL IDENTIFICATION DISK AND CENTRIFUGE

CROSS-REFERENCE TO RELATED APPLICATIONS

The present application is a Bypass Continuation Application of PCT Patent Application No. PCT/CN2023/125762, filed on Oct. 20, 2023. The content of aforesaid application is incorporated herein by reference.

FIELD

The present disclosure relates to the field of centrifuge equipment, in particular to a centrifugal identification disk and a centrifuge.

BACKGROUND

Centrifuge, a mechanical device that utilizes centrifugal force to separate components of a solid-liquid or liquid-liquid mixture, is now widely used in technical fields such as medicine, biology, and chemistry for the separation and extraction of useful substances to facilitate subsequent identification and research.

Due to the high rotational speed of the centrifuge shaft, if the shaft cannot maintain balance during operation, it can cause severe vibration of the entire centrifuge and compromise the efficiency of the separation process. Therefore, users must ensure that test tubes intended for centrifugation are placed in the corresponding sleeves on the shaft in a balanced manner according to the specified placement method. However, in practical use, significant time is required to determine the placement of each test tube. For instance, when a centrifuge has 50 positions for placing test tubes, but only a dozen tubes need to be loaded, users must spend considerable time identifying and determining the placement of each tube to ensure that the shaft remains balanced. Although some existing technologies employ indicating lights on centrifuges to guide the placement of test tubes, this requires additional electronic components inside the centrifuge. The inclusion of excessive electronic components can adversely affect the operation of the centrifuge, and the high-speed rotation of the shaft during operation can damage components such as indicating lights, thereby reducing the centrifuge's service life. Consequently, commonly used centrifuges are not equipped with additional devices to indicate tube placement. Users must manually locate the positions for the test tubes and then place them accordingly, which affects the overall progress of the experiment.

Therefore, the prior art still needs to be improved and developed.

SUMMARY

In view of the deficiencies of the prior art, the present disclosure aims to provide a centrifugal identification disk and a centrifuge, aiming to solve the problem in the prior art of how to add a device for indicating the placement of test tubes to an existing centrifuge.

The technical solution adopted by the present disclosure to solve the technical problem is as follows: a centrifugal identification disk, including an indicating ring, a clearance portion is provided in the indicating ring, and the clearance portion is used to fit around an outer side of a centrifugal assembly of a centrifuge body;

A plurality of indicating portions, the plurality of indicating portions are arranged on a surface of the indicating ring;

Each indicating portion includes an indicating icon, the indicating icons are circumferentially arranged on the indicating ring according to a predetermined pattern, and the indicating icons are used to indicate balanced positions for experimental test tubes on the centrifugal assembly.

Further, the indicating ring is detachably mounted on the centrifugal assembly via a connecting assembly.

Further, the connecting assembly includes:

A buckle, the buckle is arranged on the indicating ring;

A slot, the slot is arranged on the centrifugal assembly;

The buckle engages with the slot to connect the indicating ring and the centrifugal assembly.

Further, the buckle includes a locking protrusion and a locking spring, and the locking protrusion is arranged at one end of the locking spring.

Further, the slot includes a locking frame, and the locking frame is arranged on a side of the slot.

Further, the connecting assembly also includes a magnetic attachment component, and the magnetic attachment component is arranged on the indicating ring and the centrifugal assembly.

Further, the indicating portion is an etching layer, and the indicating icons are etched on the indicating ring; or The indicating portion is a printed layer, and the indicating icons are printed on the indicating ring; or The indicating portion is a raised layer, and the indicating icons protrude from the surface of the indicating ring.

Further, the indicating icons are digital identifiers and/or pattern identifiers.

Further, the indicating icons on different indicating portions have different colors.

A centrifuge including a centrifuge body and a plurality of centrifugal identification disks, the centrifuge body includes a housing and a centrifugal assembly, the plurality of centrifugal identification disks have different specifications;

The centrifugal assembly is used to be detachably connected to one of the centrifugal identification disks, and the centrifugal assembly includes:

A rotating shaft, the rotating shaft is rotatably connected to the housing;

A turntable, an axis the turntable is fixedly connected to one end of the rotating shaft;

A plurality of placement grooves, the plurality of placement grooves are uniformly around the turntable in a circular configuration;

the indicating icons correspond one-to-one with the plurality of placement grooves.

Beneficial Effects

The present disclosure provides a centrifugal identification disk and a centrifuge. The centrifugal identification disk is installed on a centrifugal assembly of the centrifuge, and an indicating ring of the centrifugal identification disk is arranged on an outer circle of the centrifugal assembly. A plurality of indicating icons are further arranged on the indicating ring, so that different types of indicating icons can be used to replace electronic devices such as indicating lights. Or the centrifugal identification disk can be installed on an existing centrifuge, and the positions of test tubes can be indicated by the indicating icons. Then the test tubes can be placed in the centrifugal assembly quickly and accurately, and be centrifuged by the centrifuge, thereby improving the structural stability of the centrifuge, avoiding damage to the centrifuge during operation, and improving the product performance and reliability of the centrifuge.

DETAILED DESCRIPTION OF EMBODIMENTS

In order to make the purpose, technical solution and advantages of the present disclosure clearer, the present disclosure is further described in detail with reference to the accompanying drawings and embodiments. It should be understood that the embodiments described here are only used to explain the present disclosure and are not used to limit the present disclosure.

In the description of the present disclosure, it should be understood that the terms "center", "longitudinal", "lateral", "up", "down", "front", "back", "left", "right", "vertical", "horizontal", "top", "bottom", "inside", "outside" and the like indicate positions or positional relationships based on the positions or positional relationships shown in the accompanying drawings, and are only for the convenience of describing the present disclosure and simplifying the description, rather than indicating or implying that the device or element referred to must have a specific orientation, be constructed and operated in a specific orientation, and therefore cannot be understood as a limitation on the present disclosure. In addition, the terms "first" and "second" are used for descriptive purposes only, and cannot be understood as indicating or implying relative importance or implicitly indicating the number of technical features indicated. Thus, the features defined as "first" and "second" may explicitly or implicitly include one or more of the features. In the description of the present disclosure, unless otherwise specified, "multiple" means two or more.

In the description of the present disclosure, it should be noted that, unless otherwise clearly specified and limited, the terms "installed", "connected", and "coupled" should be understood in a broad sense, for example, it can be a fixed connection, a detachable connection, or an integral connection; it can be a mechanical connection or an electrical connection; it can be a direct connection, or it can be indirectly connected through an intermediate medium, or it can be the internal communication of two components. For ordinary technicians in this field, the specific meanings of the above terms in the present disclosure can be understood according to specific circumstances.

The present disclosure provides a centrifugal identification disk and a centrifuge. In order to make the purpose, technical solution and effect of the present disclosure clearer, the present disclosure is further described in detail with reference to the accompanying drawings and examples. It should be understood that the embodiments described here are only used to explain the present disclosure and are not used to limit the present disclosure.

Embodiment 1

Figure 1:
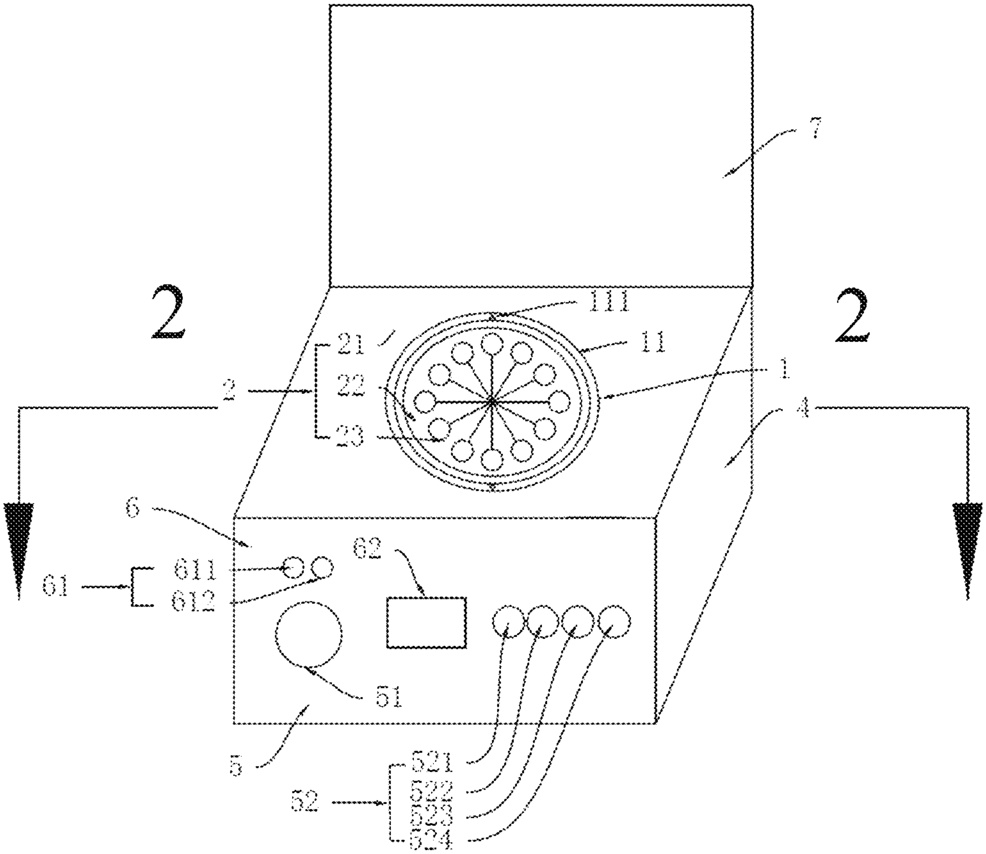
FIG. 1 is a schematic diagram of a structure of a centrifuge according to the present disclosure.
Figure 2:
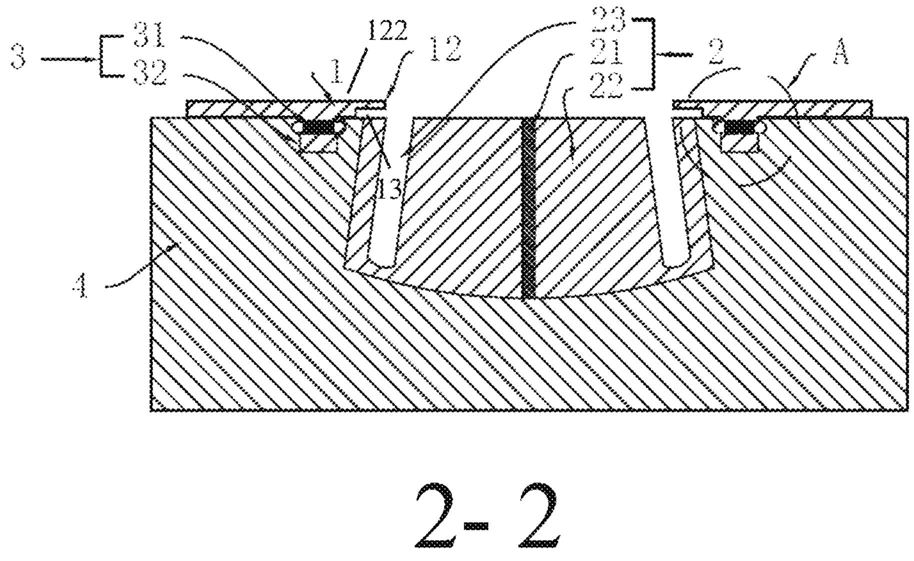
FIG. 2 is a schematic cross-sectional view along the I-I direction in FIG. 1.
Figure 3:
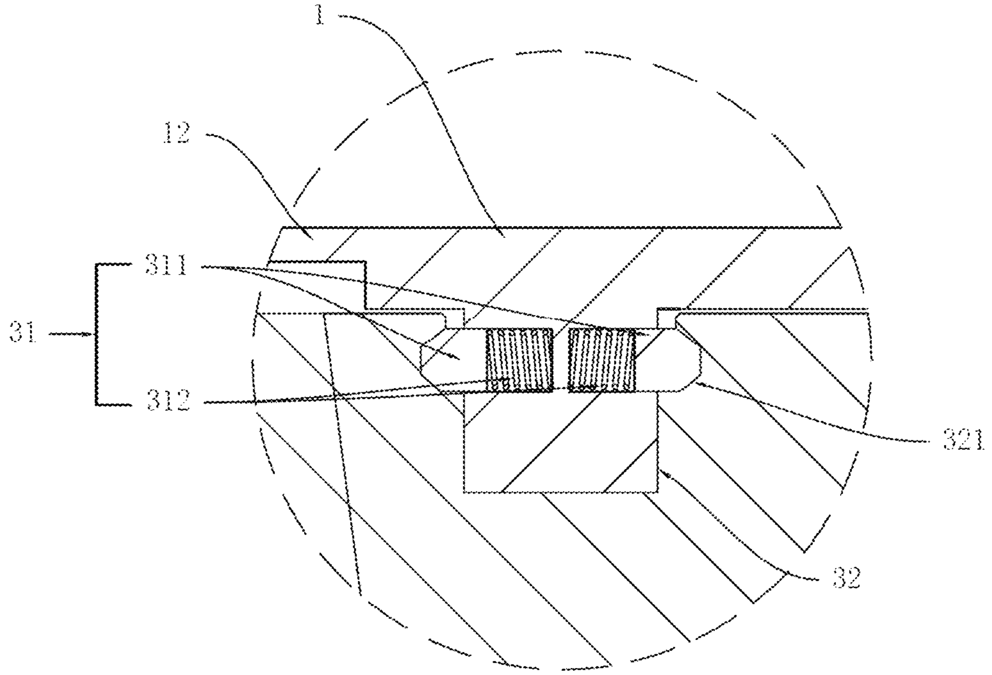
FIG. 3 is an enlarged view of part A in FIG. 2.

As shown from FIG. 1 to FIG. 3, the present embodiment proposes a centrifugal identification disk 1, which is installed on a centrifuge body and is used to indicate different numbers of test tubes placed in a centrifugal assembly 2 of the centrifuge body, so that the test tubes are located in balanced positions of the centrifugal assembly 2. Then the centrifuge centrifuges the test tubes in the centrifugal assembly 2, which solves the problem of how to add a device to indicate the placement of test tubes to an existing centrifuge in the prior art.

The centrifugal identification disk 1 includes an indicating ring 11, and a clearance portion is provided in the indicating ring 11. The clearance portion is used to be set on an outer side of the centrifugal assembly 2, so that when the centrifugal identification disk 1 is installed on the centrifuge body, it will not obstruct the process of placing the test tubes into the centrifugal assembly 2. The indicating ring 11 in the present embodiment can be a film or a thin plate, which is directly bonded to the centrifuge body; or the indicating ring 11 directly adopts a spray coating and is set on the centrifuge body by spraying. The centrifugal identification disk 1 also includes a plurality of indicating portions, which are arranged on a surface of the indicating ring 11. The indicating portions in the present embodiment can be formed on the indicating ring by printing or spraying. The indicating portions include indicating icons 111, which are arranged on the indicating ring 11 in a predetermined configuration, and are used to identify the balanced positions of the experimental test tubes on the centrifugal assembly 2. According to the indicating icons 111, the positions of the test tubes on the centrifugal assembly 2 can be quickly located, so that when the test tubes are placed, the centrifuge is still balanced, and the centrifuge can better process the test tubes. There are two situations for the predetermined configurations of the indicating icons 111. The first situation is an equally divided point distribution, where the indicating icons 111 in one indication portion are distributed at equally divided points on a circle, and the number of indicating icons 111 in each indication portion is different.

For every specification of the centrifuge, a different number of positions for placing test tubes, namely, placement grooves 23 is provided. The placement grooves 23 are evenly arranged in a circle in the centrifuge. Each placement groove 23 corresponds to a specific angle. For example, when the centrifuge has twelve placement grooves 23, the angle difference between every two adjacent placement grooves is 30°. Therefore, these placement grooves 23 are respectively located at positions where the angles are 0° (360°), 30°, 60°, etc., up to 330°, and the points that divide the circle into three equal parts are located at the angles of 0°, 60° and 120°. The centrifuge has placement grooves 23 at these three angles, and is therefore suitable for the indicating ring 11 with twelve placement grooves. When indicating the placement of three test tubes, the indicating icons 111 can be set at the three-equal points on the indicating ring 11 to indicate that the test tubes should be placed in the placement grooves 23 at the three-equal points in the centrifuge for centrifugation. Similarly, the four-equal points of the circle are located at angles of 0°, 90°, 180° and 270°, and the centrifuge has placement grooves 23 at these four angles, and is therefore suitable for the centrifuge with twelve placement grooves. When the indicating ring 11 of the placement groove indicates the placement of four test tubes, the indicating icons 111 can be set at the four-equal points on the indicating ring 11 to indicate that the test tubes should be placed in the placement groove 23 located at the four-equal points in the centrifuge for centrifugation. And the five-equal points of the circle are located at the positions of angles 0°, 72°, 144°, 216° and 288°, and it can be seen that the angle difference between the five-equal points is 72°, and there is no integer multiple relationship between 72° and 30°, so the placement grooves 23 of this type of centrifuge are not arranged in the complete positions of five-equal points. At this time, when the centrifugal effect is not required and the centrifugal progress is to be accelerated, the indicating ring 11 with six indicating icons 111 can be used. The indicating icons 111 are distributed on the six-equal points of the indicating ring 11. Five test tubes are first placed in the placement grooves 23 of the centrifuge according to the instructions of the indicating icons 111. At this time, there is one empty placement groove 23 indicated by the indicating icon 111. Therefore, a balancing test tube can be placed in the empty placement groove 23, and then the centrifuge is started for centrifugation, thereby accelerating the centrifugal progress.

The second situation of distribution of the indicating icons 111 according to a predetermined configuration is a non-equal point distribution, the multiple indicating icons 111 in one indicating portion are usually an odd number. For example, in the present embodiment, five test tubes need to be placed in a centrifuge with twelve placement grooves 23, and the five-equal points of a circle are located at angles of 0°, 72°, 144°, 216° and 288°. It can be seen that the angle difference between the five-equal points is 72°, and there is no integer multiple relationship between 72° and 30°. Therefore, the placement grooves 23 of this type of centrifuge are not located completely at the five-equal points of the circle, and the indicating icons on the indicating portion cannot be arranged at the five-equal points of the circle. So, five indicating icons 111 need to be set on the indicating ring 11 according to the balancing rule. Referring to the existing balancing rule, the indicating ring 11 is evenly divided into twelve parts, and three parts located on the three-equal points are found to set three indicating icons 111, and then divided positions are found next to two of the indicating icons 111 respectively, ensuring that the two positions are opposite to each other and symmetrical with the center of the indicating ring 11, and two more indicating icons 111 are set on these two positions. In this way, the five indicating icons 111 are completely set, and the indicating ring 11 is installed on the centrifuge to indicate how the test tubes should be placed in the placement grooves 23 of the centrifuge.

The indicating icons 111 in the present embodiment may be a pattern and/or text, so as to clearly indicate the balanced positions of different numbers of test tubes.

The indicating icons 111 may be number or text in the present embodiment. For example, the indicating icons 111 on a group of indicating rings 11 are the number two, that is, two indicating icons 111 are respectively set at two opposite positions on the indicating ring 11, and the icons are the number two. The position corresponding to the number two icon is the position where the test tube is placed, and when there are two test tubes, each test tube can be placed at the position corresponding to the indicating icons 111. In the case where only one test tube needs to be centrifuged, the group of indicating rings 11 can also be used to indicate the placement of the test tube, except that the test tube is placed at the position corresponding to any indicating icon 111, and the tube for balancing is placed at the position corresponding to the other indicating icon 111. When the indicating icons 111 are the number three or other numbers, the arrangement can be referred to the predetermined rules of the indicating icons 111 described above.

The indicating icons 111 may be patterns in the present embodiment, for example, a triangle is used instead of the number two. When the indicating icons 111 on a set of indicating rings 11 are triangle, that is, two indicating icons 111 are respectively arranged at two opposite positions on the indicating ring 11, and the icon is a triangle, the positions corresponding to the icon are the positions where the test tubes are placed, which means that the two test tubes can be placed at the positions corresponding to the indicating icon 111 respectively. In the case where only one test tube needs to be centrifuged, the set of indicating rings 11 can also be used to indicate the placement of the test tube. The test tube is placed at a position corresponded to any one indicating icon 111, and the tube for balancing is placed at the position corresponded to another indicating icon 111. At this time, different patterns can be adopted to replace different numbers. For example, a square can be used to replace the number three, that is, this group of indicating rings 11 are arranged according to the predetermined rules of the indicating icons 111 described above, and three square indicating icons 111 are provided at specific positions on the indicating ring 11, and the indicating icons 111 are used to indicate three test tubes should be placed at the positions corresponding to the indicating icons 111, and other different numbers can be replaced by indicating icons 111 of different patterns.

Therefore, each set of indicating rings 11 has different indicating icons 111, which in turn indicate that the test tubes can be placed in designated positions in the centrifuge assembly 2 more quickly and accurately, so that the centrifuge can centrifuge the test tubes as quickly as possible.

In addition, the colors of the indicating icons 111 on different indicating portions can also be different, so as to better distinguish different indicating portions, and then distinguish different centrifuge identification disks 1. For example, the indicating portions indicating the placement of two test tubes are red, and the indicating portions indicating the placement of three test tubes are blue, if it is only necessary to centrifuge two test tubes, install the indicating ring 11 with red indicating portions on the centrifuge assembly 2 before centrifugation. At this time, the indicating icons 111 on different indicating portions can be the same shape. For example, all are dots, that is, the indicating icons 111 indicating the placement of two test tubes are red dots, and the indicating icons 111 indicating the placement of three test tubes are blue dots. However, the indicating icons 111 on different indicating portions can continue to use different patterns or numbers, as described above. For example, the indicating icons 111 indicating the placement of two test tubes are red number two, and the indicating icon 111 indicating the placement of three test tubes are blue number three, etc., which saves the time of determining the indicating portions and improves the efficiency of test tube placement.

In another configuration, a combination of the digital identification and the pattern can be adopted, that is, the indicating icons 111 on the indication ring 11 indicating the placement of two test tubes are a combination of the number two and triangle, and the indicating icon 111 on the indication ring 11 indicating the placement of three test tubes are a combination of the number three and a square, etc. The indicating icons 111 can indicate more positions for placing test tubes by combining numbers and patterns.

Embodiment 2

Based on the embodiment 1, the indicating ring in the present embodiment can adopt a plate-like structure, so that the indicating portion can also be an etching layer, the indicating icons 111 are etched on the indicating ring 11, and the indicating icons 111 generated by etching is not easy to be damaged. After the centrifugal identification disk 1 has been used many times, the indicating portions are still clearly visible.

The indicating portion can also be a printed layer, and the indicating icons 111 are printed on the indicating ring 11. The printing process is more mature, having lower production cost, and higher production efficiency. The centrifugal identification disk 1 is not corroded during the printing process, ensuring the integrity of the centrifugal identification disk 1.

The indicating portion can also be a raised layer, and the indicating icons 111 protrude from a surface of the indicating ring 11. When the indicating icons 111 protrude from the indicating ring 11, the indicating icons 111 are more obvious, so that the indicating icons 111 indicate the positions of test tube placement of the centrifugal assembly 2 more clearly, thereby improving the efficiency of test tube placement.

In the first embodiment of the present disclosure, the indicating ring 11 is directly placed on the centrifugal assembly 2 of the centrifuge, and each indicating icon 111 is aligned with a placement groove 23 in the centrifuge, so that after the indicating ring 11 is placed, the position of the test tube can be quickly located, and the test tubes can be immediately placed in the placement grooves 23 according to the indication of the indicating icons 111. Then the indicating ring 11 is removed, and then the centrifuge is started to centrifuge the test tubes; at the same time, in order to prevent the position of the indicating ring 11 from shifting when it is placed on the centrifuge, an adhesive portion can be provided at the corresponding position of the indicating ring 11 and/or the centrifuge, so that the indicating ring 11 can be placed on the centrifuge more firmly to avoid position shifting, and the indicating ring 11 can be easily removed after the test tubes are placed. Then the centrifuge is started to centrifuge the test tubes. It can be seen that the indicating ring 11 is detachably arranged on the centrifugal assembly 2.

In the present embodiment, in addition to being fixed by bonding, in order to prevent the indicating ring 11 from shifting when it is placed on the centrifuge and fix the position of the indicating ring 11, the indicating ring 11 can also be detachably mounted on the centrifugal assembly 2 through a connecting assembly 3. For example, the connecting assembly 3 includes a magnetic attachment component (not shown in the drawings), and the magnetic attachment component is installed on the indicating ring 11 and the centrifugal assembly 2. The indicating ring 11 is installed with a positive pole, and the corresponding position of the centrifugal assembly 2 is installed with a negative pole, or the indicating ring 11 is installed with a negative pole, and the corresponding position of the centrifugal assembly 2 is installed with a positive pole. In this way, when the indicating ring 11 is installed on the centrifugal assembly 2, the indicating ring 11 and the centrifugal assembly 2 are attached together by magnetic force, thereby fixing the indicating ring 11 on the centrifugal assembly 2, and the indicating icons 111 indicate how the test tubes are placed in the placement groove 23. When the test tubes are placed and the indicating ring 11 needs to be removed, a certain external force can help separate the indicating ring 11 from the centrifugal assembly 2.

Embodiment 3

Based on the second embodiment, the connecting assembly 3 may further include a buckle 31 and a slot 32, as shown in FIG. 2 and FIG. 3. The buckle 31 is arranged on the indicating ring 11, and the slot 32 is arranged on the centrifugal assembly 2. The buckle 31 includes a locking protrusion 311 and a locking spring 312, and the slot 32 includes a locking frame 321. The locking spring 312 is relatively arranged on a partition of the buckle 31, and then the locking protrusion 311 is arranged on the end of the locking spring 312 away from the partition, and the locking frame 321 is arranged on a side of the slot 32. It can be understood that when the indicating ring 11 is installed on the centrifugal assembly 2, the buckle 31 is pressed into the slot 32, the locking spring 312 is pressed, and then the locking protrusion 311 enters the slot 32. Under the action of the elastic force of the locking spring 312, the locking protrusion 311 is inserted into the locking frame 321, and the buckle 31 is fixed in the locking groove 32. When the indicating ring 11 is removed from the centrifugal assembly 2, the centrifugal identification disk 1 is lifted up, and the locking protrusion 311 slides along the inclined surface of the locking frame 321, and then moves out of the locking frame 321, and finally moves out of the locking groove 32. Further, in order to prevent the centrifugal identification disk 1 from affecting the operation of the centrifugal assembly 2, and at the same time allow the indicating icons 111 to more intuitively indicate the position of the test tube in the centrifugal assembly 2. An upper portion 122 of the centrifugal identification disk 1 also includes a clearance portion 12, the clearance portion 12 protrudes from the centrifugal identification disk 1, and creates a notched portion 13 that maintains a certain distance between the centrifugal assembly 2, so as to make the indicating icons 111 as close as possible to the position where the test tube is placed in the centrifugal assembly 2, and at the same time, it also avoids the centrifugal identification disk 1 from interfering with the operation of the centrifugal assembly 2.

Embodiment 4

As shown in FIG. 1, the present embodiment further provides a centrifuge for separating components in a solid-liquid or liquid-liquid mixture. The device can indicate different numbers of test tubes to be placed in the centrifuge assembly 2 through different types of indicating icons 111, and then the centrifuge centrifuges the test tubes. Therefore, the problem in the prior art can be solved that when the indicating structure for indicating the placement of test tubes in the centrifuge is electronic device, the indicating structure is easily damaged when the centrifuge is working.

The centrifuge includes a centrifuge body, and the centrifuge body includes a housing 4 and a centrifuge assembly 2 arranged in the housing 4. At this time, the centrifuge also includes a plurality of centrifuge identification disks 1 as described above. The centrifuge assembly 2 is used to separate the components in the mixture of solids and liquids in the test tube or the mixture of liquids, for example, to separate the solid particles from the liquid in the suspension, or to separate the two liquids with different densities and immiscible with each other in the emulsion. The centrifuge identification disk 1 is used to indicate the positions of the test tubes having different numbers in the centrifuge assembly 2, and the centrifuge body is used to be detachably connected with a centrifuge identification disk 1. At the same time, the centrifuge body also includes a controlling component 5 and a display component 6. The centrifugal assembly 2, the controlling component 5 and the display component 6 are all electrically connected. The controlling component 5 is used to control the operation of the centrifugal assembly 2 to ensure that the components of the mixture in the test tube are fully separated. The display component 6 is used to display the operating status of the centrifuge. In addition, in order to prevent the substances in the test tube from being thrown out of the centrifuge when the centrifuge is working, and to ensure the normal operation of the centrifuge, a cover 7 is hinged on one side of the housing 4. While the cover 7 is hinged to one side of the housing 4, and to better observe the situation in the centrifugal assembly 2 when the centrifuge is running, the cover 7 is a transparent cover, so that the operation situation in the centrifugal assembly 2 can be observed without obstacle.

Since the area of the upper surface of the housing 4 is limited, and each group of indicating rings 11 needs to occupy a certain area, it is not possible to set all the indicating rings 11 on the outer ring of the centrifugal assembly 2. Therefore, the designated indicating ring 11 can be set on the outer ring of the centrifugal assembly 2 according to the needs, and then the designated number of test tubes are placed according to the mark on the indicating ring 11, and finally the indicating ring 11 is removed. Therefore, the centrifuge body is used to be detachably connected with a centrifugal identification disk 1. For example, when a centrifuge with twenty positions of test tubes placement needs to centrifuge twelve test tubes, the indicating ring 11 with the indication of the placement of these test tubes can be set on the outer ring of the centrifugal assembly 2, and then the twelve test tubes are placed according to the position corresponding to the indicating icon 111 on the indicating ring 11, and finally the indicating ring 11 is removed. This configuration can also be used to place fourteen or other test tubes in the centrifuge for centrifugation, without spending a lot of time looking for the position of each test tube before placing the test tube, thereby greatly shortening the time spent on finding the positions of test tubes placement and improving the efficiency of the centrifuge for centrifuging the test tube.

As shown in FIG. 1, in another embodiment, the centrifugal assembly 2 includes a rotating shaft 21, a turntable 22 and a plurality of placement grooves 23. The rotating shaft 21 is rotatably connected to the housing 4, and an axis of the turntable 22 is fixedly connected to one end of the rotating shaft 21, that is, the rotating shaft 21 drives the turntable 22 to rotate. At the same time, the placement grooves 23 are evenly arranged around the turntable 22, and the placement grooves 23 rotate with the turntable 22, so the rotating shaft 21 drives the turntable 22 to rotate, and then drives the placement grooves 23 to rotate. Furthermore, the indicating icons 111 correspond one-to-one with the placement grooves 23, that is, one indicating icon 111 on the indicating ring 11 corresponds to one certain placement groove 23. In the present embodiment, twelve placement grooves 23 are arranged in the turntable 22. That is, according to the balancing rule, there are ten kinds of indicating rings 11 for the centrifuge, and the ten indicating rings 11 include the ones having two to ten indicating icons 111 and the one having twelve indicating icons 111. When a certain indicating ring 11 is placed on the centrifuge, each indicating icon 111 corresponds to a placement groove 23, and the corresponding position is the position of the test tube placement. When one test tube needs to be placed for centrifugation, it is only necessary to place the test tube in any placement groove 23 in the centrifuge, and then place a balancing test tube at the relative position of the test tube to perform centrifugation. Similarly, when eleven test tubes need to be placed for centrifugation, it is only necessary to put all the eleven test tubes in, and then put a balancing test tube in the empty placement groove 23 to perform centrifugation.

Furthermore, detection sensors (not shown in the drawings) are installed at the bottom of each placement groove 23, and the detection sensor is electrically connected to the controlling component 5, and is used to detect whether a test tube is placed in the placement groove 23, and to weigh the weight of the test tube in each placement groove 23. The weighing result is sent to the controlling component 5. The controlling component 5 determines whether to start the centrifuge component 2 to centrifuge the test tube based on the result, so as to ensure the normal operation of the centrifuge and avoid damage to the centrifuge.

In another embodiment, the controlling assembly 5 includes a power switch key 51 and a start selection key 52, and the controlling assembly 5 is electrically connected to the centrifuge assembly 2 and the display assembly 6 respectively. The power switch key 51 is arranged on the left side of the front surface of the housing 4, and is used to control whether the centrifuge is connected to the power supply, and when an unexpected situation occurs in the centrifuge, the operation of the centrifuge can be stopped immediately by the power switch key 51. The start selection key 52 is arranged on the right side of the front surface of the housing 4, and the start selection key 52 includes a start key 521, a function key 522, a plus key 523 and a minus key 524. The start key 521 is used to start the centrifuge operation, and the function key 522 is used in conjunction with the plus key 523 and the minus key 524 to switch and adjust the speed and duration of the centrifuge, and the number of test tubes placed in the centrifuge can also be pre-set. When the number of test tubes placed does not match the set number, the display assembly 6 issues an alarm, so that the centrifuge is checked according to the alarm, the test tubes are placed again and the parameters of the centrifuge are adjusted accordingly.

In another embodiment, the display assembly 6 includes a display light 61 and a display screen 62. The display assembly 6 is electrically connected to the centrifugal assembly 2. The display light 61 includes a power light 611 having single color and a status light 612 having matching colors. The display light 61 is arranged above the power switch key 51, and the status light 612 is arranged on the left side of the power light 611. The power light 611 is used to detect whether the power of the centrifuge is connected, that is, when the centrifuge is not connected to the power supply or the power switch key 51 is in an off state after the power supply is connected, the power light 611 is not on. The power light 611 is on only after the centrifuge is powered on. The status light is used to indicate the operating status of the centrifuge. For example, when the status light shows green, everything is normal; when the status light shows yellow, it indicates that the centrifuge is not balanced and the rotating shaft 21 cannot rotate; when the status light shows red, it indicates that there is structural damage in the centrifuge.

The display screen 62 is arranged between the power switch key 51 and the start selection key 52, and is used to detect the state of the centrifuge, and cooperate with the function key 522, the plus key 523 and the minus key 524 to adjust the parameters such as the speed and time. At the same time, the corresponding fault can also be displayed when the centrifuge cannot run, so as to facilitate the maintenance of the centrifuge.

In summary, when the centrifuge in the present embodiment is used to separate the substances in the mixture, first open the cover 7, place the indicating ring 11 on an outer ring of the centrifugal assembly 2, then place the test tubes in the placement grooves 23 corresponding to the indicating icons 111, close the cover 7, press the power switch key 51 to turn on the power, adjust the centrifugal parameters and start the centrifuge operation through the start selection key 52. Then, the rotating shaft 21 drives the turntable 22 and the placement grooves 23 to rotate, thereby starting the centrifugation of the test tubes to complete the separation of the substances in the mixture, and finally release the power switch key 51, open the cover 7 and take out the test tubes.

It should be understood that the present disclosure is not limited to the above embodiments. For those skilled in the art, improvements or modifications can be made according to the above description. All these improvements and modifications should fall within the scope of protection of the claims attached to the present disclosure.

What is claimed is:

1. A centrifugal identification disk, comprising: an indicating ring, a clearance portion is provided in the indicating ring, and the clearance portion is configured to fit around an outer side of a centrifugal assembly of a centrifuge body, and protrudes radially inward from an upper portion of the centrifugal identification disk, and creates a notched portion configured to maintain a distance above and between the centrifugal assembly and the centrifugal identification disk;

a plurality of indicating portions, the plurality of indicating portions are arranged on a surface of the indicating ring; and each indicating portion comprises an indicating icon, the indicating icons are circumferentially arranged on the indicating ring according to a predetermined pattern, and the indicating icons are configured to indicate balanced positions for experimental test tubes on the centrifugal assembly;

wherein the indicating ring is detachably mounted on a centrifuge housing via a connecting assembly, the connecting assembly comprising:

a buckle, the buckle is arranged on the indicating ring;

a slot, the slot is arranged on the centrifugal assembly; and the buckle engages with the slot to connect the indicating ring and the centrifugal assembly.

2. The centrifugal identification disk according to claim 1, wherein the buckle comprises a locking protrusion and a locking spring, and the locking protrusion is arranged at one end of the locking spring.

3. The centrifugal identification disk according to claim 1, wherein the slot comprises a locking frame, and the locking frame is arranged on a side of the slot.

4. The centrifugal identification disk according to claim 1, wherein the indicating portion is an etching layer, and the indicating icons are etched on the indicating ring; or the indicating portion is a printed layer, and the indicating icons are printed on the indicating ring; or the indicating portion is a raised layer, and the indicating icons protrude from the surface of the indicating ring.

5. The centrifugal identification disk according to claim 1, wherein the indicating icons are digital identifiers and/or pattern identifiers.

6. The centrifugal identification disk according to claim 1, wherein the indicating icons on different indicating portions have different colors.

7. A centrifuge, comprising: a centrifuge body, the centrifuge body comprises a centrifuge housing and a centrifugal assembly, wherein the centrifuge further comprises a plurality of centrifugal identification disks according to claim 1, the centrifuge housing is configured to be detachably connected to one of the centrifugal identification disks, and the centrifugal assembly comprises:

a rotating shaft, the rotating shaft is rotatably connected to the housing;

a turntable, an axis of the turntable is fixedly connected to one end of the rotating shaft; and a plurality of placement grooves, the plurality of placement grooves are uniformly around the turntable in a circular configuration;

wherein the indicating icons correspond one-to-one with the plurality of placement grooves.

8. The centrifuge of claim 7, wherein each of the plurality of centrifugal identification disks have a different number of the plurality of placement grooves.

* * * * *